United States Patent [19]

Ueda

[11] 4,074,349

[45] Feb. 14, 1978

[54] METHOD AND A SYSTEM OF NUMERICALLY CONTROLLING A CUTTING MACHINE

[75] Inventor: Masanobu Ueda, Suita, Japan

[73] Assignee: Dainichi Kinzoku Kogyo Co., Ltd., Amagasaki, Japan

[21] Appl. No.: 624,993

[22] Filed: Oct. 22, 1975

[30] Foreign Application Priority Data

Apr. 9, 1975 Japan .................................. 50-43636

[51] Int. Cl.² ............................................. G06F 15/46
[52] U.S. Cl. .................................... 364/107; 364/120; 364/474
[58] Field of Search .................................. 235/151.11

[56] References Cited

U.S. PATENT DOCUMENTS

| | | | |
|---|---|---|---|
| 3,533,076 | 10/1970 | Perkins et al. | 340/172.5 |
| 3,783,253 | 1/1974 | Anderson et al. | 235/151.11 |

OTHER PUBLICATIONS

Microprogramming Handbook by Microdata, 1971, pp. 10, 11, 54, 55, 64, 65, 66, 67.

Primary Examiner—Eugene G. Botz
Attorney, Agent, or Firm—Shlesinger, Arkwright, Garvey & Dinsmore

[57] ABSTRACT

A method of numerically controlling the displacement of a working tool with respect to a rotated article subjected to said working according to the output signal of a computer capable of accepting plural executing program blocks and a system for carrying out said method.

6 Claims, 27 Drawing Figures

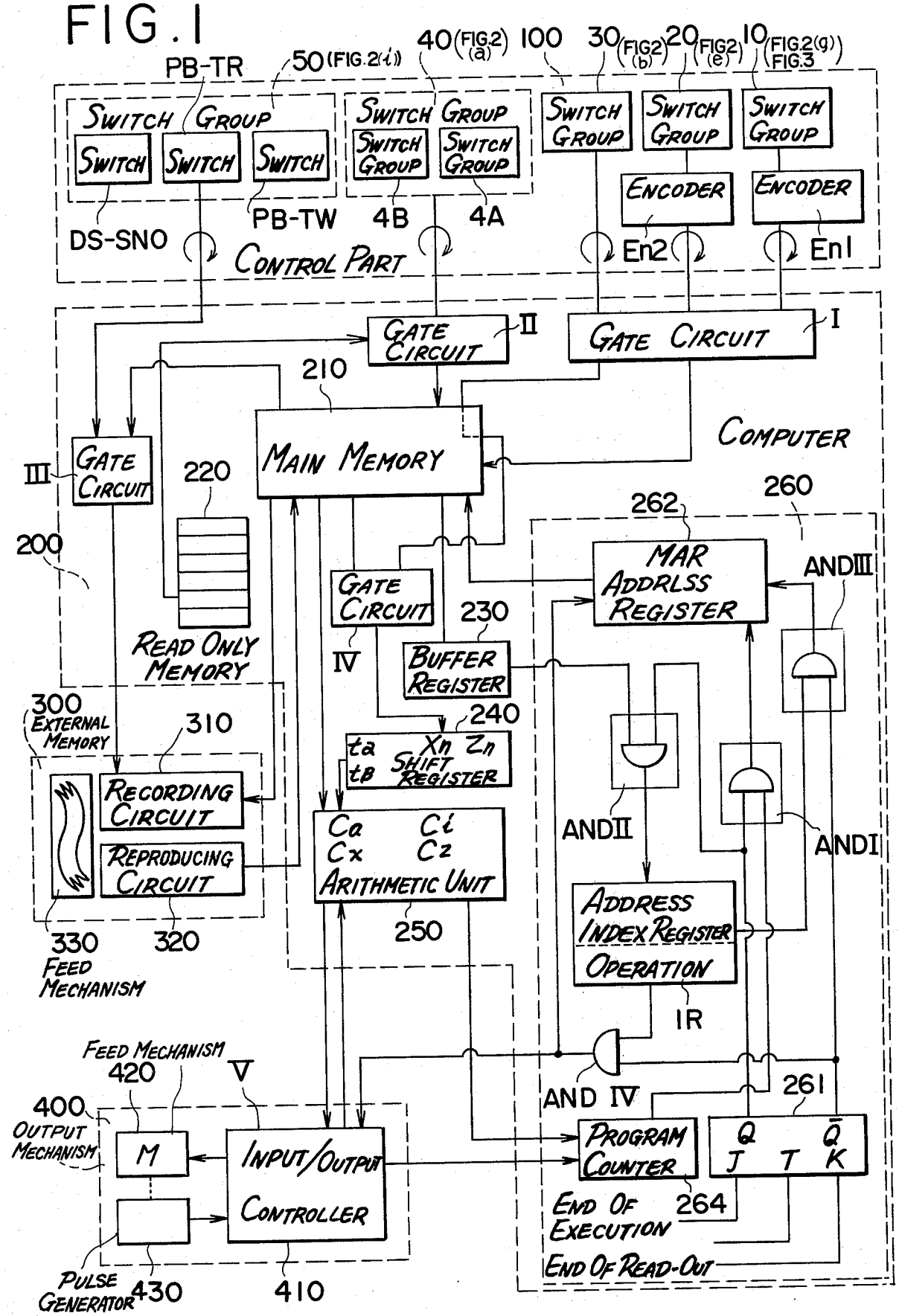

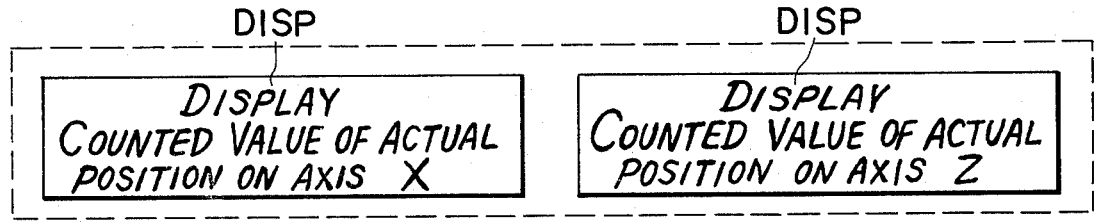
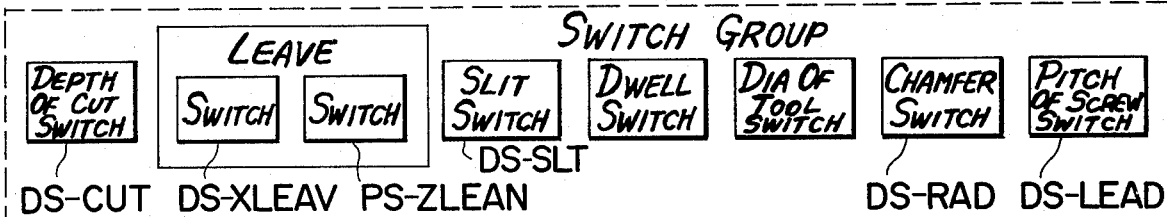
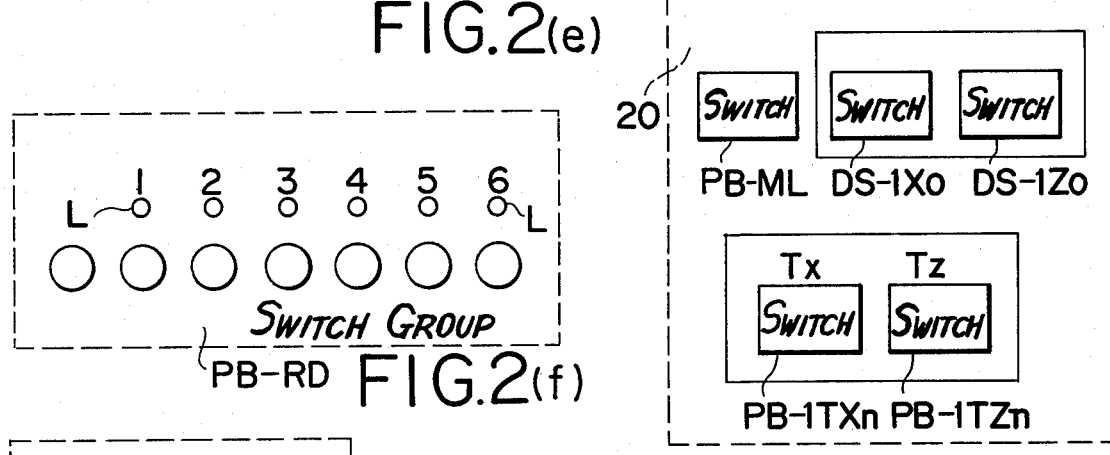
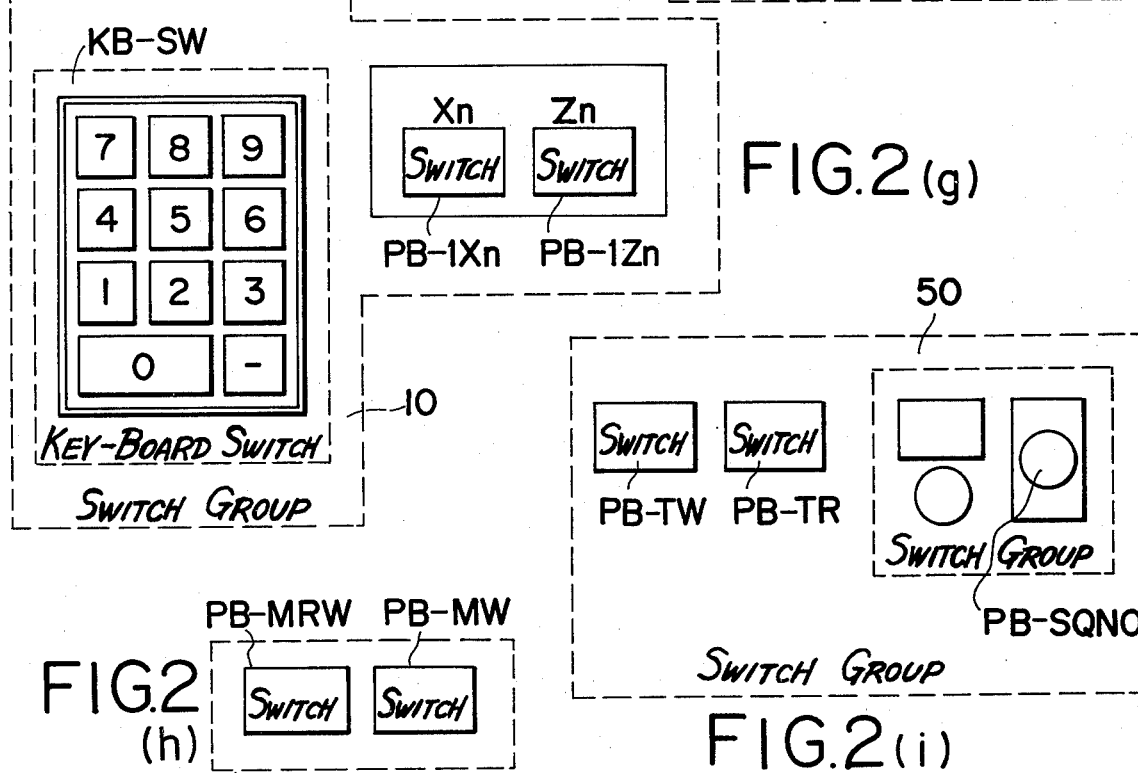

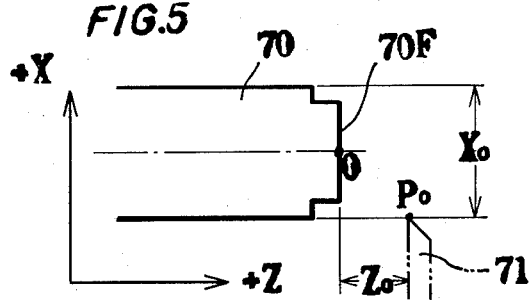
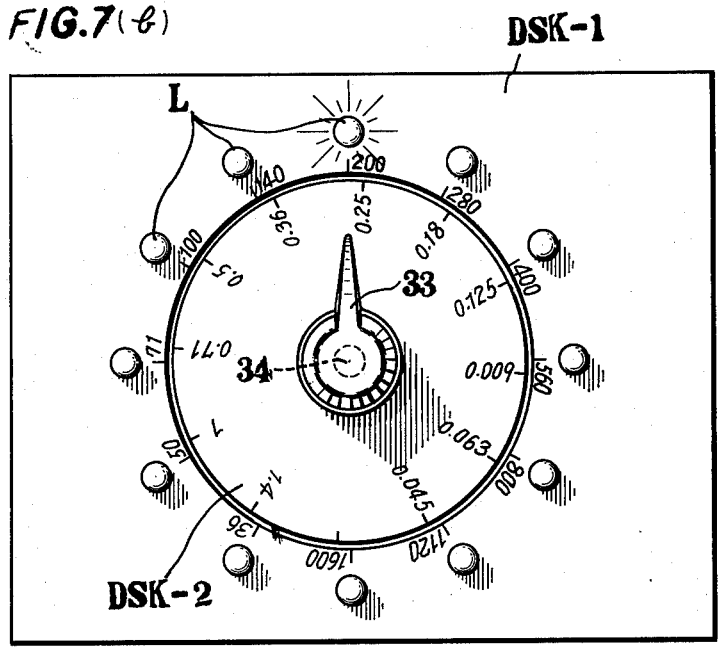
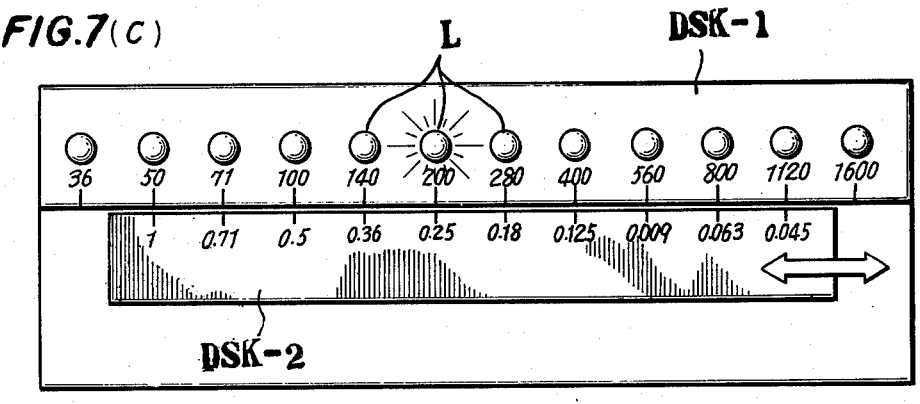

FIG.6
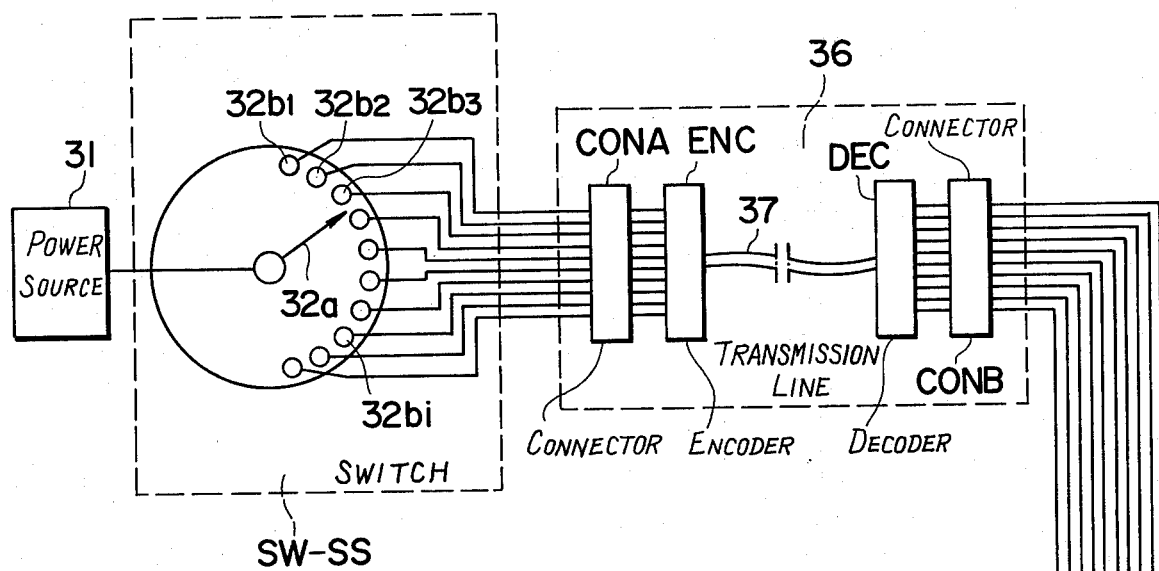
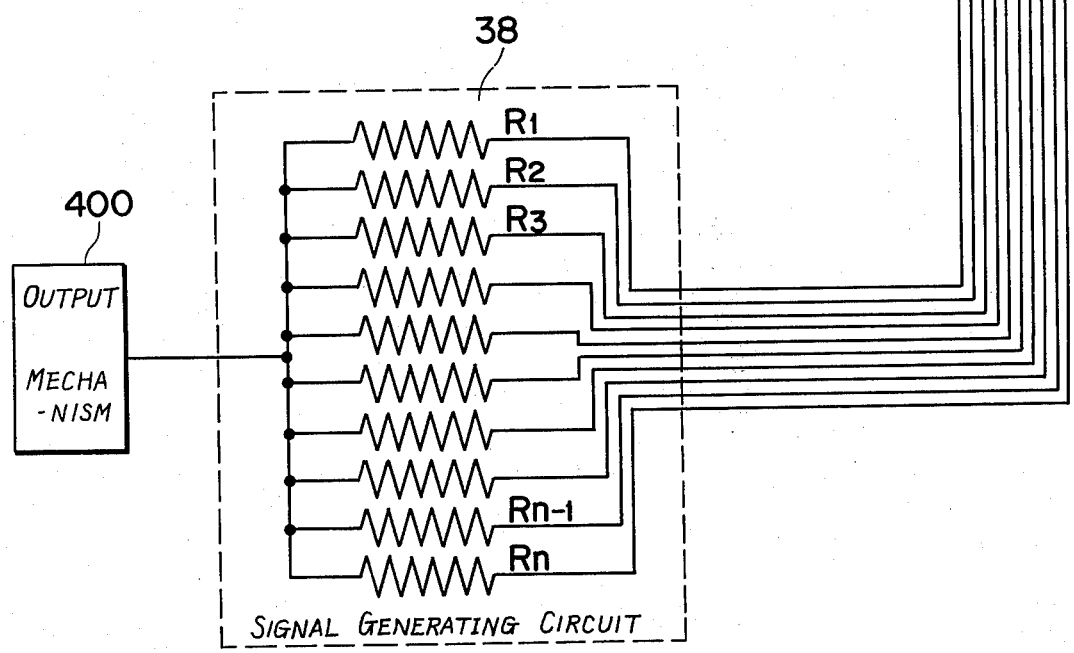

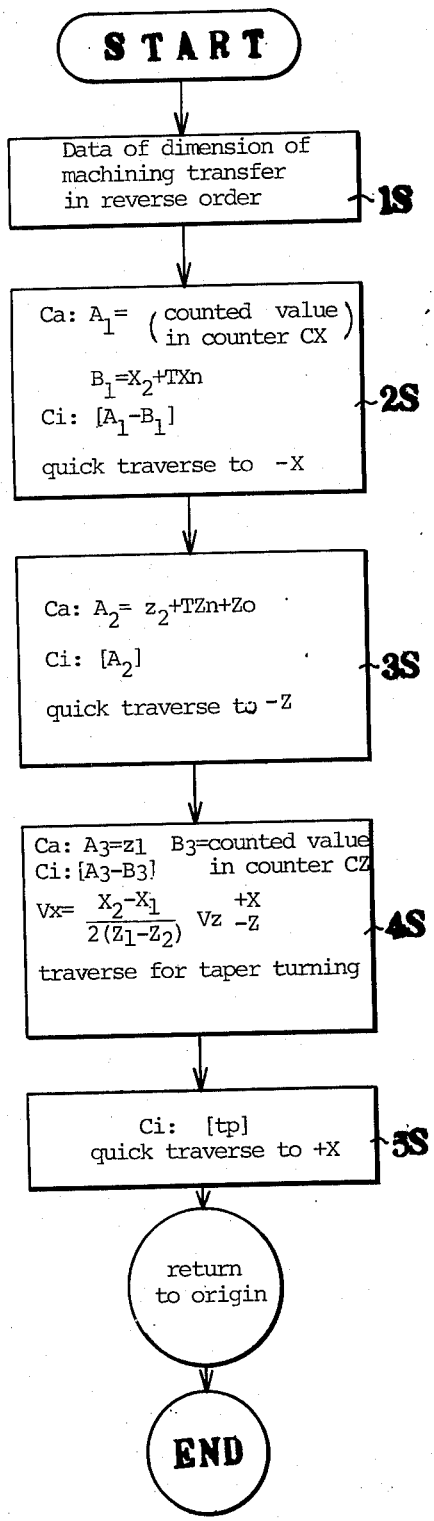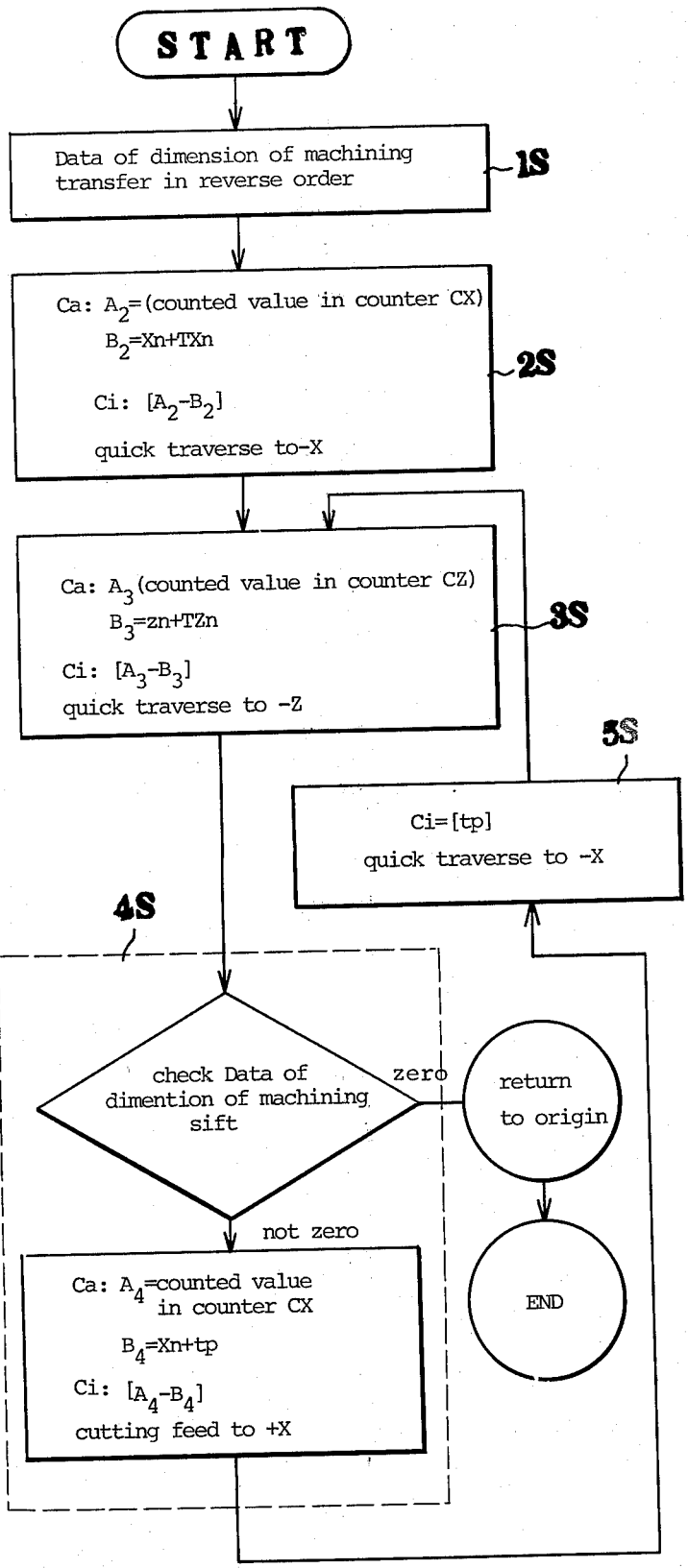

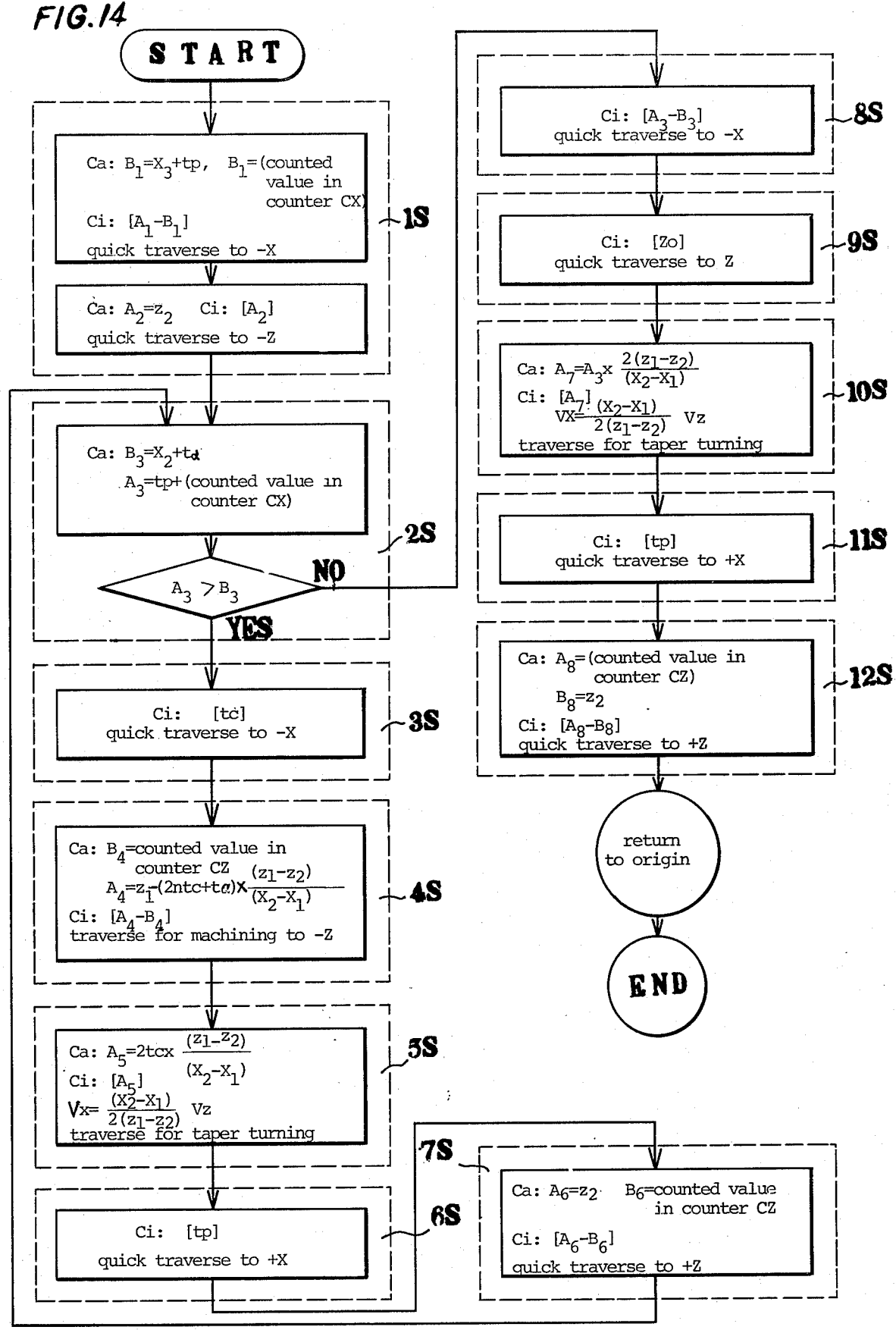

METHOD AND A SYSTEM OF NUMERICALLY CONTROLLING A CUTTING MACHINE

This invention relates to a method and a system of numerical control, particularly control to machining by controlling displacement of a cutting tool against a revolving work.

An object of the invention is to provide a means and a system for numerically controlled machining by a programmable computer which permits an operator simple input operations by himself who has not any well-trained computer-programming in order that said computer executes many programs which are applicable to required dimensions and conditions to be worked.

An another object of the invention is to provide a means and a system of numerical control with high machining efficiency for many lots with small quantity which require repetitive and successive cutting numerically controlled by the computer operated by simply pushing buttons.

The further object of the invention is to provide a numerical control system of the computer that a worker of the machining can input data by himself and that does not require any important maintenability.

Conventional numerically controlled machine-tools, for example, a lathe, cut a turning work by displacing a cutting tool, for example, a tool, in radial or axial direction of the work, and the speed, the direction, and the traveling length of the tool are controlled by means of well-known servomotors. A carriage can slide along the axis X or Y on a sliding plane at desired speed and in desired directions by means of feed shafts. The traveling length of said tool is controlled by means of said servomotor linked to said carriage.

In machining, there exist two major categories, i.e. rough machining and finishing, and types of machining such as rough cutting, finishing, fluting, thread cutting, and cornering etc., directions of machining such as right-hand outer diameter, left-hand outer diameter, right-hand taper, left-hand taper, right-hand inner diameter, and left-hand inner diameter etc., and dimensions of machining such as maximum traveling length of the tool, depth of cut, and tool correction (correction of origin due to changing of tools) can be present on request.

In conventional numerical controls, programmed data with arithmetic operations recorded on a medium, for example magnetic tapes, punched cards etc., according to the type of machining, the direction of machining, and the dimensions of machining are input into a computer for numerical control. In this case, recording operation of program into the medium and input operation of the data in said medium are executed by experts who are specially trained on programming, which requires an excessive operation section and large capacity mediums, in other words long tape. Such matters result in raising expense for cutting works.

Particularly, many lots with small quantity for machining require input operations in order to input the data into said computer which are trouble-some and become lower efficiency of machining operations. Said lots of a plurality of works which are machined periodically require trouble-some operations of input for the data.

According to the invention, output signals of the arithmetic unit in the computer which can program a plurality of the operational programming blocks not including variable numerical data for machining of revolving works numerical control displacement of cutting tools.

Data of limited traveling lengthes of said tool for the axial direction and the radial direction of said revolving works are numerically coded and numbered in order, and data for cutting pathes selected in accordance with the type of machining are numerically coded, and said data are directly input into said computer by the operation of manual switches, and one block in said arithmetic operational programming blocks is selected by manual switch operation, and instruction signals of the selected operational programming block introduce said order-numbered numerically coded signal as well as pulse signals proportional to the traveling length of said cutting tool into the arithmetic unit of said computer, and the output signals operated arithmetically on both signals control the traveling length of said cutting tool.

Furthermore, data of machining ever worked, numerically coded signals including the aforementioned block number coded signals of the selected operational program, the aforementioned order-numbered numerically coded signals, and the aforementioned numerically coded signals of the cutting process are written into external memories by means of manual switches and read out them again and input into said computer, and, as discribed above, the output signals from said computer control traveling length of the aforementioned tool.

The numerical system of the invention makes provision, at least, for a first group of switches to give data of maximum traveling length of the aforementioned cutting tools in the axial and radial directions of the aforementioned revolving work the order to be executed, the groups of switches being incorporated with encoder circuits having lines connected to the main memory of the aforementioned computer, and a plurality of manual switches incorporated with encoder circuits having lines connected to the main memory in order to select one block among the aforementioned operational programming blocks, and means to introduce, by a signal of starting machining, order-numbered numerically encoded signals into the arithmetic unit according to the numbered order by the instruction stored in the main memory, for example a pulse generator which is capable to send out serially pulse signals, which are proportional to the traveling length of the aforementioned tool, to the arithmetic unit, and means to control servomotors and feed shafts according to operated output signals of the computer, for example logic circuits.

And also, the aforementioned numerical control system provides, at least, means to record on mediums, for example, paper tapes and magnetic tapes etc., informations including the selected block number coded signals of the arithmetic unit and the numerically coded signals concerning machining, and encoder circuits connected to the switches which can feed to external memories the informations which can be selectively regenerated in the external memory. The aforementioned system also provides means of feed instruction converter and repetitive direct instructor of same dimension feed in order to control-traveling speed and/or traveling directions of the cutting tools.

The aforementioned switches are arranged on one control panel and said control panel can be mounted in reach of an operator.

The aforementioned numerical control system also provides means a second group of switches like the aforementioned first group of switches in order to preset dimension data of the type of machining, and, by virtue of these switches, the dimension data of machining can be input by simple manual operation into the computer. The second group of switches can be preferably provided with switches which can set as an origin of machining the coordinates of the tool against the revolving center on the starting plane of machining of the work after test cutting and leaving said tool from said work and stopping machining, switches to correct the origin of machining due to chaning tools, switches to preset depth of fluting and dimension of leave in rough cutting of the aforementioned tool, and switches to preset feed speed on the axes X and Z at one finish machining of the tool.

Each block of the aforementioned operational programs is composed of words including data essentially constant in one machining stroke, and is written preferably in a ROM as a matter of well-known knowledge. And also, operation instructions of each block in said operational program have at least subroutines to fix the number of strokes of the cutting tool according to the numbers of the aforementioned order-numbered numerically coded signals.

The aforementioned arithmetic unit of the computer is provided, at least, with an up-down counter in order to substantially add or substract at every stroke of one machining the coordinates of the tool against the origin when the machining starts, and a counter to add and subtract essentially the traveling length of the tool at one stroke of one machining according to numerical data signals input by the first and the second groups of switches to or from counted values of said counter, and a memory to store serial pulse signals proportional to said operated value, for example a shift register.

One embodiment of the invention of the numerical control means and equipments are shown in the following many drawings.

FIG. 1 shows a block diagram of a system of numerically controlled machining of a revolving work which is provided with a control panel in order to manually input machining data into a computer which can be programmed by a plurarity of operational programs.

FIGS. 2(a) to 2(i) show a control panel on which switches used for manual input operation of the aforementioned numerical control system are mounted.

FIG. 5 illustrates a relative position of a revolving work and the tool edge for reference of setting coordinates or origin positions for machining controlled by the system of the invention.

FIG. 6 shows the block diagram of feed instruction converter used in the invention.

FIG. 7b shows a plan of a dial panel of the multi-contact switch used in the aforementioned feed instruction convertor.

FIG. 7c shows a plan of an another embodiment of a dial panel fixed on the multi-contact switch used in the aforementioned feed instruction convertor.

FIG. 13 shows a basic flow-chart concerning the operational programming block of a machining type under a conbination of right-hand outer diameter-finish in the invention.

FIG. 14 shows a basic flow-chart concerning the operational programming block of a machining type under a combination of right-hand taper turning-rough cutting in the invention.

FIG. 15 shows a basic flow-chart concerning the operational programming block of a machining type under a combination of right-hand taper - finish in the invention.

Figure 2A:
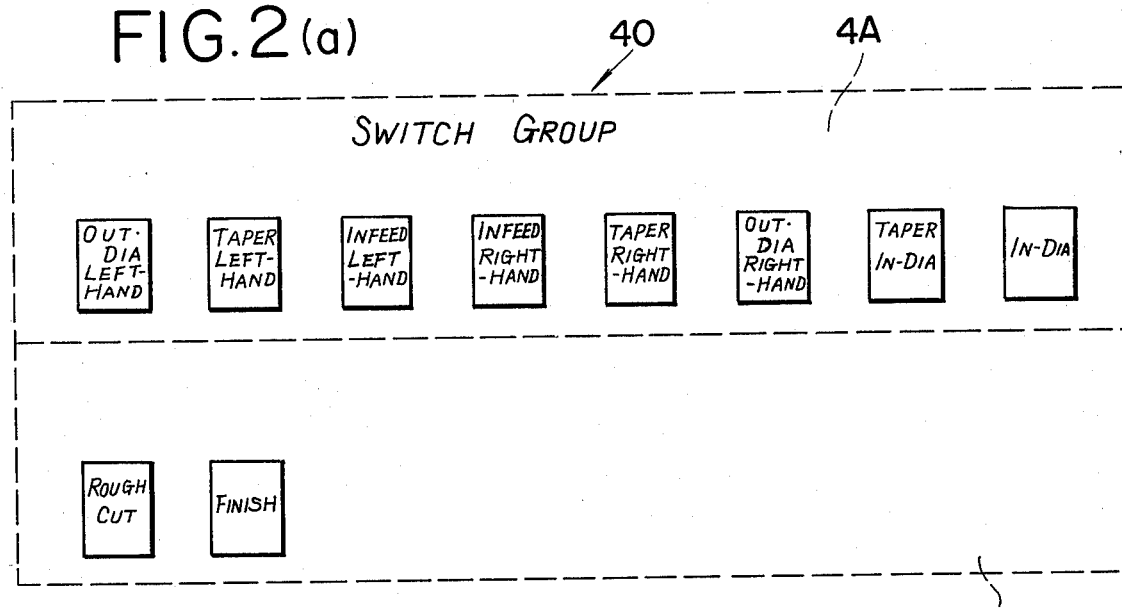
Figure 2B:
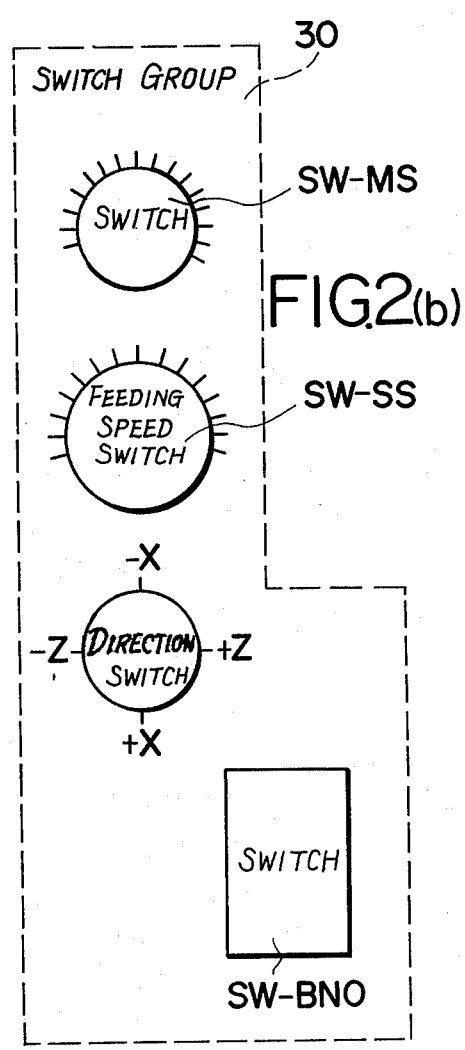
Figure 2C:
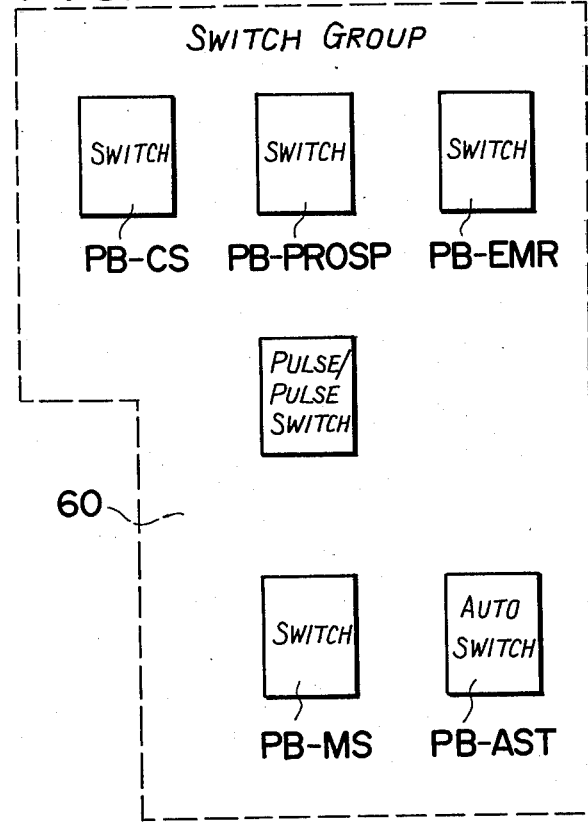

An embodiment according to the invention applied to a cutting machine, for example a lathe, will be explained, referring to FIG. 1.

The fundamental control of the invention is to control a carriage (not shown), on which a tool, for example a tool, is fixed by means of feed mechanism, for example a feed shaft (not shown) and a servomotor M for driving the feed shaft in the directions of X and Z in a plane of a sliding base of a lathe (not shown). The angle of revolution, the direction of revolution (counterclockwise, clockwise) and the revolution speed of the Motor M or the feed shaft are controlled by signals of the computer.

The numerical control system, basically shown in FIG. 1, is provided with control part 100, which input by manual operation a group of numerical data for machining in radial and axial directions and a group of data for instructing traveling lengthes of the aforementioned tool (i.e. the carriage) according to the type of machining, and which instruct to write the both aforementioned data blocks into external memory 300, and also which instruct to read out selectively both said data blocks, and computer 200 which seen out to the aforementioned feed mechanism control signals operated by input data signals from said control part 100 and electric signals proportional to the traveling length of the aforementioned cutting tool, and external memory devices 300 which write from or read out to recording mediums, for example paper tape or magnetic tape, the aforementioned both data signals preset in the aforementioned control 100, and feed mechanism 400. The control part 100 is provided with first group of swiches 10 to preset the maximum traveling length of the cutting tool for the revolving work, second group of switches 20 to preset a value of the traveling length of the cutting tool for said work, third group of switches 30 to preset the revolution speed of the aforementioned work, the feed speed of the aforementioned cutting speed, and the change of the aforementioned cutting tool, etc., and fourth group of switches 40 to select operational programming blocks in order to set machining conditions by combining each one condition in both cutting directions and types of machining, and fifth group of switches 50 to instruct writing in on reading out from the external memory the informations preset in the aforementioned first to fourth group of switches and sixth group of switches 60 of start machining, of emergency stop, of manual machining, and of pulse feed, and display DISP of the arithmetic units CX and CZ in the computer. The console is consisted of these switch groups and the display mounted on a panel shown in FIGS. 2(a) to 2(i).

Figure 3:
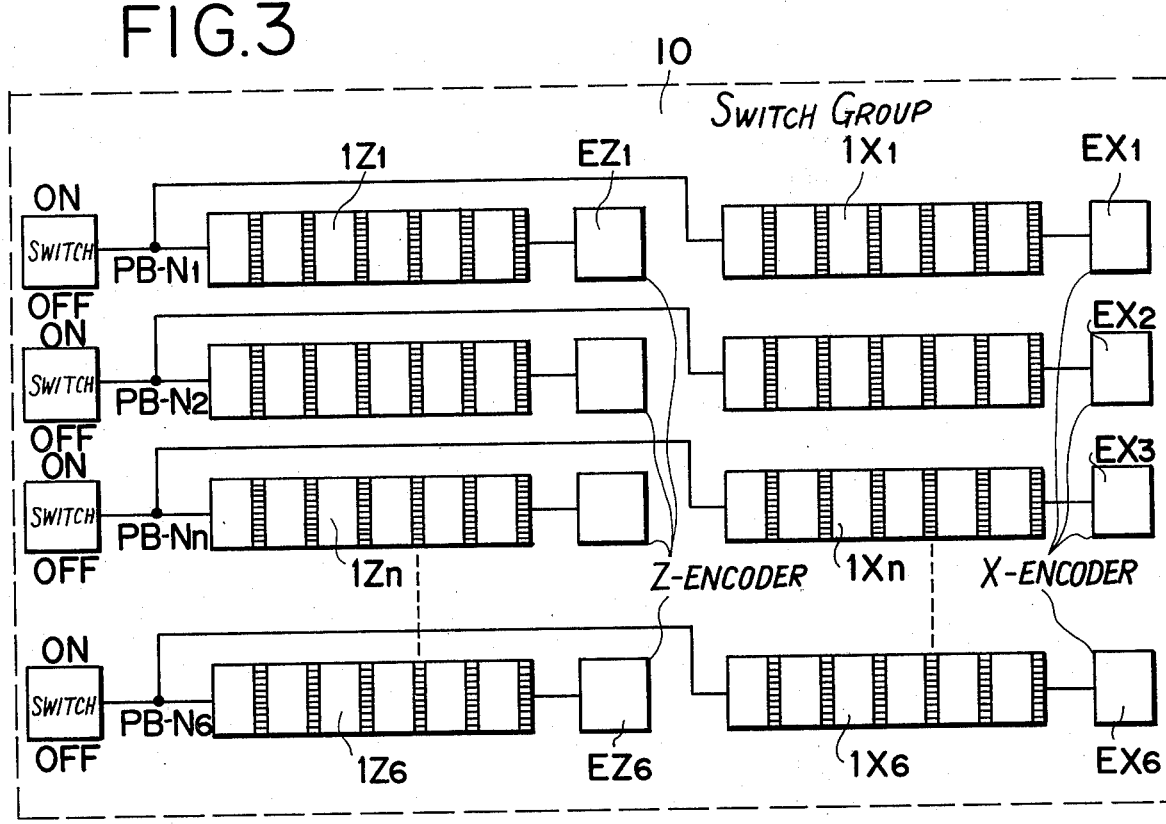
FIG. 3 shows a general view of a console panel in case that digital switches are used for the first group of switches for machining process controlled by the system of the invention.
Figure 4:
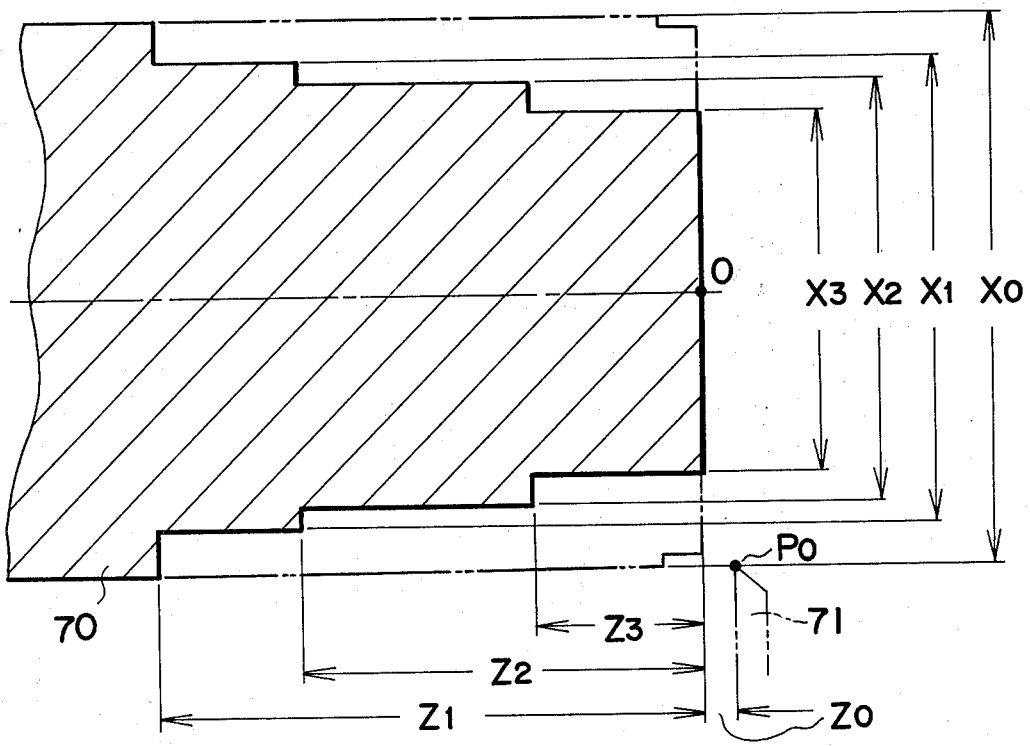
FIG. 4 illustrates a relationship between a tool edge and machining of a revolving work relating to presetting numerical data of cutting controlled by the system of the invension.

The aforementioned first and second group of switches are provided with a group of push buttons, and a key board switch KB-SW having numerical keys of 0 to 9 and a symbol key of -. The first switch permits to input into the computer the data concerning the maximum traveling length of the cutting tool, i.e., machining dimensions of the work. The input numerical data of diameter $Xn(n=1,2,\ldots n)$ and length $Zn(n=1,2,\ldots n)$ of work 50 are input to the computer by means of the switch, as shown in FIG. 4. Said dimension data are numbered in order and numerically coded. After pushing the button PB-Xn or PB-Zn and then the key switch KB-SW equal to a machining dimension, the dimension is numbered according to its order and numerically coded by means of a well-known decorder circuit, and, furthermore, said order-numbered numerically coded signals are transferred into main memory 210 of computer 200 through gate circuit 1(will be described later) upon an operation of push button PB-MW. Another possible operation of the aforementioned first and second group of switches and the key board switch KB-SW in order to input numerical data into computer 200 is to set and display the numerical values on digital switch $IX_1$-$IX_6$, $IZ_1$-$IZ_6$ (for example, 1976 series Digital Thumbwheel Switch called in the market made by Electronic Engineering Company of California) which can be replaced instead of said first and second group of switches and said key board switch. In this case, the switches in the first group 10 are arranged in a matrix with 2 columns and 6 lines having 6 digital switches in each column on a control panel as shown in FIG. 3, and push button switches PB-Nn$(n=1,2,\ldots n)$ are arranged so as to be adjacent to the corresponding line. The numerically coded signals of the value set on the digital switches can be input into the computer 200 in the order of the line number only when the push buttons in the group make contacts. For example, dimension data $X_1$, $Z_1$, $X_2$, $Z_2$, $X_3$ and $Z_3$ in FIG. 4 are set in the digital switch of each line DS-$X_1$, DS-$Z_1$, DS-$X_2$, DS-$Z_2$, DS-$X_3$ and DS-$Z_3$ with a make-contact of PB-$N_1$, $N_2$ and $N_3$. Then, upon pushing the switch PB-MW, the numerically coded signals are transferred to said part 210 according to n number of said switch PB-Nn. The numerical data set by the second group of switches 20 for the coordinate concerning the origin of the tool edge ($Xo$, $Zo$), the depth of the cut tc at one machining stroke by the cutting tool, the excess stock of the axes X and Z$t\alpha$ and $t\beta$, the depth of fluting ts, the radius of chamfering, the lead of thread, correction dimensions due to changing the cutting tool, etc. are input into the aforementioned computer. The numerical data are input into computer 200 after numerical coding, same as the operation of the input data by the aforementioned the first group of switches 10, by means of the encoder circuit for numerical encoding and the push button PB-MW.

The coordinates of the origin of machine (Xo, Zo) are determined by a test cutting of a work and their machining is stopped before the numerical control, i.e., a push of the push button PB-AsT. As illustrated in FIG. 5, the origin of machining Po is determined at tool edge 71 in the plane X-Z with respect to revolving center O of the end plane 70 for starting to machine the work. The original position of machining Po concerning said tool 71 after test cutting is the distance Xo from the point O after a suitable displacement on the axis X near to the surface of the outer diameter of said work 70 after having measured the test-machined diameter of said work 70 and the distance Zo along to the axis Z between the aforementioned end plane 70F and said tool edge.

The half of said value Xo, however, is preset on the aforementioned first group of switches 10 in case that the machining dimension Xn is noted in radius. The feed dimension tc is determined by an operator as a dimension to feed a cutting tool into a work in order to roughly cut the revolving work. The dimensions of excess stock $t\alpha$ and $t\beta$ are determined by an operator as dimensions left after rough cutting of the revolving work on the axis X and Z.

The radius of chamfering, the lead of screw, the taper, etc. are determined by the arithmetic unit 250 of the computer 200 with aid of the intermediary values of feed along the axis X and Z based on the operation equation explained later.

The dimensions of tool correction TXn and TZn are the preset correction values which are equal to differences between the coordinates of cutting tool relating to the origin of machining before changing and that of the new tool after changing.

The numerical data set by the first and second group of switches converted to numerically coded signals can be displayed on Nixie tubes etc. through well-known decoder circuits which is visible and can be transferred to the aforementioned computer.

The third group of switches 30 is provided with switch SW-MS for revolution speed of a work, switch SW-SS for feed speed of a cutting tool, and switch SW-BNO instructing changing tools in machining processes of a cutting tool controlled numerically, all the switches will be explained in great detail later.

The combination conditions of machining type are determined by an operator, selecting directions of tool traverse and types of machining at the operator's choice, on fourth group of switches 40. Said fourth group of switches 40 is provided with, for example, groups of switches 4A and 4B of which indexes correspond to the aforementioned conditions and of which contacts correspond to said indexes. And also, said fourth group of switches is provided with functions to select various operational programming blocks programmed and stored in the memory of the computer.

Said group of switches 50 is provided with a switch, for example, a push button switch PB-TW, which permits to read out electric signals (data signals and address signals) of numerically coded signals concerning machining transferred to main memory 210 through the aforementioned first, second and third group of switches and to record them on the medium, for example, paper tape of external memory mechanism 300 and with a switch, for example, a push button switch PB-TR, which permits to reproduce signals recorded on the medium and with a switch DS-TSNS which permits to instruct address of the signal recorded said recording medium. When said switch PB-TW or PB-TR is closed, recording circuit 310 and feed mechanism 330 or reproducing circuit 320 and said mechanism 33 are functioned by electric signals with suitable level through logic gate III of computer 200.

The switch SW-SS in the aforementioned third group of switches is a multi-contact switch which is an element of the feed instruction convertor in order to convert feed-speed instruction of usual unity of feed speed (mm/min) to feed instruction of feed quantity (mm/rev.).

Figure 7A:
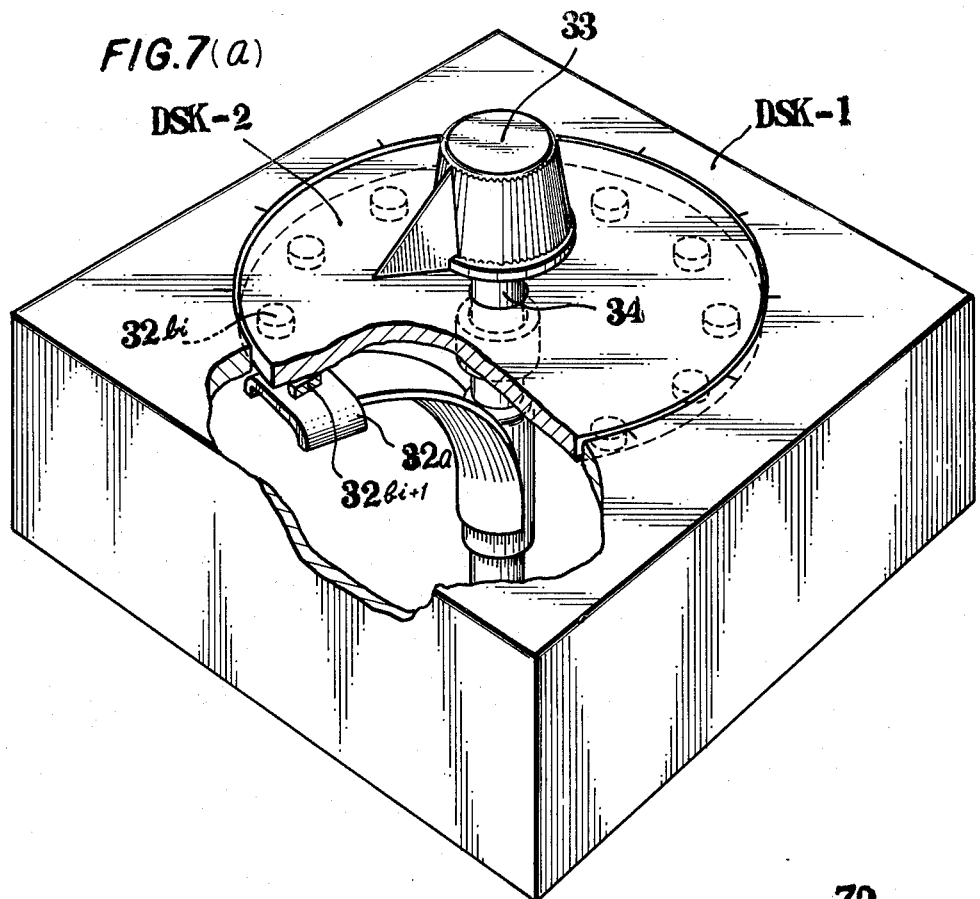
FIG. 7a shows a view of an example of the multi-contact switch used in the aforementioned feed instruction convertor.

The feed instruction convertor is basically provided with power source 31 and multi-contact switch 32 and transmission lines 36 and signal generation circuit of feed-speed instruction 38. Power source 31 supplies voltage signals with desired level, for example, rectified dc source. The multi-contact switch SW-SS is provided with two dials as shown in FIG. 7b. On the dial DSK-1, indexes are the number of revolution of main spindle (the unity is usually 1 r.p.m.) and graduation. On the dial DSK-2, indexes are feed quantity per one revolution of main spindle ( the unity is usually mm/rev) and graduation. Either one dial of two dials DSK-1 and DSK-2 is a fixed dial, while the other a movable dial. For example, the dial DSK-1 can be fixed and the dial DSK-2 can be movable. On both dials, graduations are indexed at the circular edge. The graduation on the dials DSK-1 and DSK-2 can be represented in line shown in FIG. 7c and the movable dial can be linearly moved with freedom. The indexed number on the dial DSK-1 is preferably selected so as to be divided in geometrical progression and that on the dial DSK-2 is same with same ratio.

Brush 32a is mounted on the aforementioned dial DSK-2, for example. Contactor 32 bi ($i=1,2, \ldots n, n$: arbitrary), which corresponds to the indexes on the aforementioned dial DSK-2, is mounted on the dial. When the indexes both on the dials DSK-1 and DSK-2 are in coincidence, said brush 32a and contact 32 bi on the corresponding index on the dial DSK-2 electrically close the contact. On the dial DSK-1, in order to indicate the index corresponding to the revolution speed of the main spindle of a latch working a nob with an arrow or display lamps L are mounted.

Nob 33 is provided with rod 34 (corresponds to the aforementioned 32a) and dial DSK-1. The aforementioned display lamps L are mounted near at the indexed and are lit when the speed is equal to the indexes on the dial DSK-1 by means of triggers or limit switches, for example.

Line 36 is composed of contacts 32 bi to which lines 37 are connected, and said lines 37 are, for example, cables or cabtyre code, and multi-contact connectors CONA and CONB are equipped at the extremity.

Feed instruction signal generating circuit 38 is a circuit to generate signals converted to desired analog signals (this analog signal is called feed speed instruction signal) from electric signals (voltage signal from the aforementioned power source 1) transmitted through one line of lines 37, and an example of the circuit is resistors with various resistances or a variable resistance with multiple tap. The resistance of resistors connected in series to the aforementioned lines 37 is adjusted to such a value as the motor M in the feed mechanism turns at the revolution proportional to the indexed feed value of the switch SW-SS on the dial DSK-2. As explained above, the speed of the carriage is coincident with the feed per one revolution shown on said dial DSK-2.

Encoder ENC and decoder DEC are connected to the both ends of the aforementioned line 36, which results in reducing number of conductor in said line.

Encoder ENC and decoder DEC are, for example, diode matrix circuit as well-known (not shown in the figures).

Encoder ENC is connected to input terminals of a diode-matrix circuit and to contacts of multi-contact switch 32. The number of terminals of said circuit is the binary number of the number of the input terminals and the input lines are connected to the output lines through diodes as well-known technology.

Decoder DEC consists of input lines of binary numbers and output lines of decimal numbers, i.e., number of contacts of the aforementioned multi-contact switch 32, and is connected to said input lines and output lines through required diodes as the aforementioned decoder DEC. The output lines of the decoder DEC are connected to the input lines of the aforementioned feed instruction signal generating circuit 38.

By the aforementioned switch SW-SS, the revolving speed of the main spindle i.e., the revolving speed of the work is preset and control signals are fed to a motor and/or a clutch and the revolution of the main spindle can be controlled.

By the switch SW-BNO, the number of the cutting tools fixed on a turret mounted on a carriage is preset and the turning angle is controlled and the selected cutting tool is used for the machining.

Computer 200 is provided with main memory 201 having magnetic cores and magnetic discs, etc., and read-only-memory(ROM)220 which is integrated circuits and stores various operational programming blocks not including data of machining dimensions and of machining, and buffer registers 230 storing instruction words(WORD signals) which are written into said main memory 210 through the aforementioned fourth group of switches 40, and shift registers 240 storing coded signals of the value preset by the aforementioned second group of switches 20 and order-numbered numerically coded signals reset by the aforementioned first group of switches 10 in order of numbering or reverse numbering, and arithmetic unit 250, and control unit 260 in order to execute successively each steps of operational programming block stored in the aforementioned registers 230, and input-output control mechanism 290 having gate circuit blocks I, II, III, IV, V, to control signal transfer among the aforementioned control unit 100, external memory 300, and feed mechanism 400.

The aforementioned shift registers 240 are provided with a shift register which permits to send out one data signal by one data signal in order of numbering or reverse numbering according to the instruction in the aforementioned operational programming blocks after storing the aforementioned order-numbered numerically coded signals in turn selected from numerically coded signals of machining transferred from main memory 210, and a shift register which is capable of adding cumulatively according to the aforementioned operational programming blocks after having stored the dimension of excess stock $t\alpha$ of the axis X and the dimension of excess stock $t\beta$ of the axis Z.

The aforementioned arithmetic unit 250 is preferably provided with four digital counter units. The four counters are arithmetic unit Ca which operates arithmetic and square root operations according to counting pulse signals concerning traveling directions and lengthes of the aforementioned cutting tool, and reversible counters CX and CZ which count actual X and Z coordinates of the cutting tool referred to original X and Z coordinates of the cutting tool for each one traveling stroke, and counter Ci which counts one absolute traveling length of said cutting tool. The aforementioned counting pulse signals are serial pulse signals based on numerically coded signals input by the aforementioned first and second group of switches and serial pulse signals from pulse generator 430 described later.

The aforementioned control unit 260 is a circuit to control sequential execution of each operational programmed steps according to the instructions of the operational programming blocks stored in the main memory 210 from the aforementioned ROM by means of the aforementioned fourth group of switches, and said circuit can be shown in a well-known typical circuit. The instruction read-out circuit is proivided with one output O of J-K flip-flop 261 and AND gate circuit ANDI and address register 262 and the aforementioned main memory 210 and the aforementioned buffer memory 230 and AND gate circuit II and index register 263. The instruction execution circuit is provided with another output Q of said circuit 261 and AND gate III and the aforementioned register 262 and the aforementioned gate circuit IV and program counter 264.

The gate circuits I, II, III, IV are composed of well-known AND logic circuit, NAND logic circuit and NOR logic circuit, and control transfer of the aforementioned data signals. External memory unit 300 is, for example, a well-known papertape punch mechanism and is provided with recording circuit 310, which read out and punch on a papertape the data signals stored in the aforementioned main memory 210, and feed mechanism 330 of said tape. Signals recorded in the aforementioned tape are at least orderly numbered numerically coded signals stored in the aforementioned main memory 210 through the aforementioned first group of switches and signals selected by the aforementioned fourth group of switches from numerically coded signals preset by the aforementioned second group of switches and address signals of the aforementioned operational programming blocks by said fourth group of switches. It is preferable to include signals preset by the aforementioned third group of switches in these signals. Upon generation of a start signal of machining by the aforementioned PB-AST in signals read out by means of reproduction circuit 320, the numerically coded signals are introduced into the aforementioned main memory 210 and the aforementioned address signals are fed to the aforementioned gate circuit II and one operational programming block is introduced into said main memory 210 from the aforementioned ROM.

Output mechanism 400 is provided with input/output control 410 and feed mechanism 420 and length measuring pulse generator 430.

Said input/output control 410 controls communication among feed mechanism 420 and pulse generator 430 and computer 200 and is provided with well-known various logic circuits, for example, relays, flip-flop circuits, etc.

Feed mechanism 420 is provided with a feed shaft of the carriage mouting the cutting tool (preferably equipped on the axis X and Z) and a servomotor M driving each shafts through clutches in order to transfer the carriage.

Pulse generator 430 generates serial pulse signals of which number is proportional to the traveling length of the carriage, i.e., the traveling length of the tool edge. For examples, a rotary generator mounted on the shaft of the aforementioned motor M or the feed shaft generates serial pulse signals of which number is proportional to the angle of rotation of said shaft. A photocoupler can also generate directly serial pulse signals of which number is proportional to the traveling length of said carriage. The output of said generator 430 is fed to the aforementioned arithmetic unit 250 through said input/output control 410. The number of the serial pulse signals is, for example, set so as to be 100 pulses for 1 mm of the aforementioned traveling length of the cutting tool.

The aforementioned counters Cx and Cz function as up-counter for positive traveling length (on the axis X, the direction parting from the rotating center of the work, and on the axis Z, the direction parting from the head stock) and as down counter for negative traveling length (on the axis X, the direction approaching to the rotating center or the work, and, on the axis Z, the direction approaching to the head stock). During one stroke of machining on the axis X or Z by the cutting tool, the counting pulses in the arithmetic unit Ca are input to the aforementioned counters Cx and Cz and said counters Cx and Cz substantially cumulatively add or subtract and are not reset until the end of execution of the aforementioned operative grogram. The counted values of the counters Cx and Cz are displayed on the aforementioned display DIS by means of a well-known decoder circuit.

The aforementioned arithmetic unit Ca is adjusted so as to count half of numerically coded signals concerning maximum traveling length Xn of the aforementioned cutting tool on the axis X. If the aforementioned value is preset as radius, such reduction count is not required. The pulse signals to be counted of said arithmetic unit Ca are fed to the aforementioned counter unit Ci and subtraction is executed at every entry of one pulse of serial pulse signals from the aforementioned pulse generator 430. When the counter Ci becomes zero, the counter is reset and the aforementioned motor M is stopped at the same time by means of, for example, R-S flip-flop circuit. In this case, when the converter Ci counts up to the preset value, the aforementioned motor M is controlled to reduce the speed by means of, for example, a well-known circuit of comparison or a R-S flip-flop circuit.

An example of machining according to the invention will be explained.

I. Direction and type of machining: right-hand outer diameter, rough cutting, feed: tc, excess stock: $T\alpha$(Axis X), $T\beta$(axis Z), maximum traveling length of cutting tool: $X_1, Z_1, X_2, Z_2$ (refer to FIGS. 5 and 6), origin or coordinate of machining: $(X_O, Z_O)$.

The suitable feed speed of the cutting tool (the carriage) is set by the multi-contact switch SW-SS in the aforementioned feed instruction convertor and the suitable revolution speed of the main spindle is set by the switch SW-MS. Numerically coded signals of $X_1$ and $X_2$ are introduced in order into main memory 210 of the aforementioned computer 200 by pushing the number display key of the key-board switch KB-SW after pushing the push-button switch PB-Xn of the first group of switches. In similar way, numerically coded signals of $Z_1$ and $Z_2$ are in order introduced into the aforementioned main memory 210 by pushing the push-button switch PB-MW after a push of the number display key of the aforementioned key-board switch KB-SW with a successive push of the push-button switch PB-Zn. In similar way, numerically coded signals of $X_O$ are intrucuded in order into the aforementioned memory 210 by pushing the push-button switch PB-MW after pushin the push-button switch PB-$X_O$ with a successive push of the number display key of the key-board switch KB-SW. In similar way, numerically coded signals of $Z_O$ are introduced in order into the aforementioned main memory by said push button switches KB-SW and PB-MW after pushing said push-button switch PB-$Z_O$. Some operations permit to intruduce numerically coded singals of the dimension of feed tc, the dimension of excees stock $t\alpha$ and $t\beta$ into the aforementioned main memory 210. The switches of "right-hand outer diameter" and "rough cutting" in the fourth group of switches 4A and 4B turn on.

Signals sent out to the aforementioned gate circuit II through the fourth group of switches 4A and 4B are converted in said circuit II into address signals of the aforementioned ROM according to the conditions of the type of machining combining right-hand outer diameter and rough cutting. The converted signals are introduced into the aforementioned main memory 210 upon a push of the push-button switch PB-MW.

After operations of such groups of switches, numercially coded signals introduced into the aforementioned main memory upon a push-button switch PBS-MS are transferred to the aforementioned register 240 and instruction signals of the operational programming blocks according to the aforementioned combined machining type based on signals introduced into the aforementioned main memory 210 through the aforementioned group of switches 4A and 4B. And, upon a push of the switch PB-AST for starting machining, numerically controlled machining, i.e., execution of the aforementioned operational programs for the combined type of machining begins.

Figure 12:
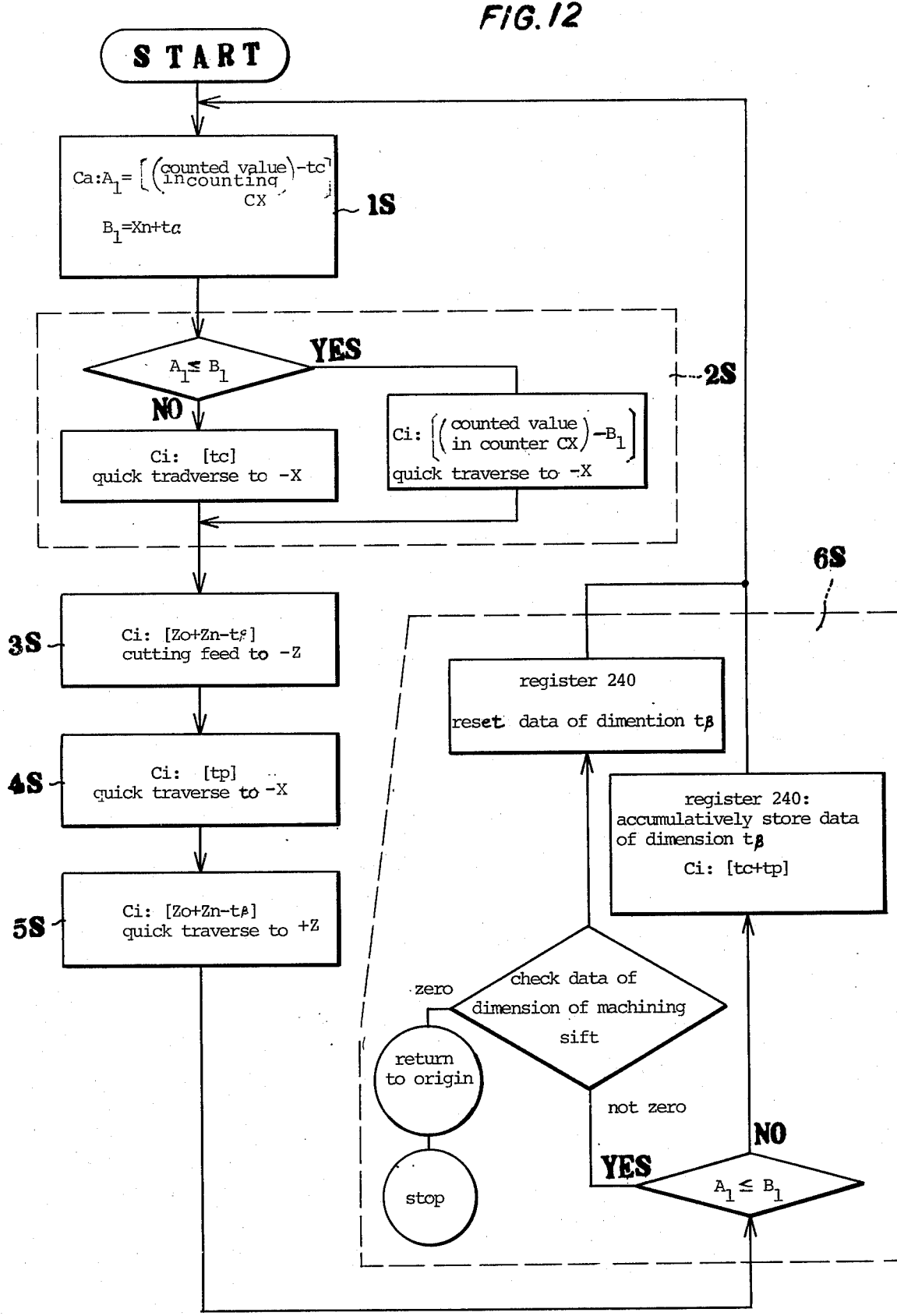
FIG. 12 shows a basic flow-chart concerning the operational programming block of a machining type under a combination of right-hand outer diameter - rough cutting in the invention.

The operational program for the aforementioned combined type of machining is, for example, shown in FIG. 12. At the first step 1S, counting pulse signals $A_1$ [present position of tool edge (initially, origin $X_O$ and $Z_O$), i.e., counted value of $Cx$ — dimension o feed tc] and counting pulse signals $B_1$ equal to dimension of machining on axis X [dimension of machining Xn (initially, $n=1$, and $X_1$) on axis X + dimension of leave $t\alpha$ on axis X] are fed to the arithmetic unit Ca.

At the second step 2S, the pulse signals $A_1$ input to the arithmetic unit Ca are compared with the pulse signals $B_1$ and, if not $A_1 > B_1$, signals [present position of cutter edge, i.e., counted value in counter $Cx$ — counted value of pulse signals $B_1$] are fed to the counter Ci and quickly traversed to - X. If the aforementioned signal $A_1$ is smaller than or equal to the aforementioned signal $B_1$, i.e., $A_1 \leq B_1$, numerically counted signals equal to [depth of cut tc] are fed to the counter Ci and quickly traversed to - X.

Figure 8:
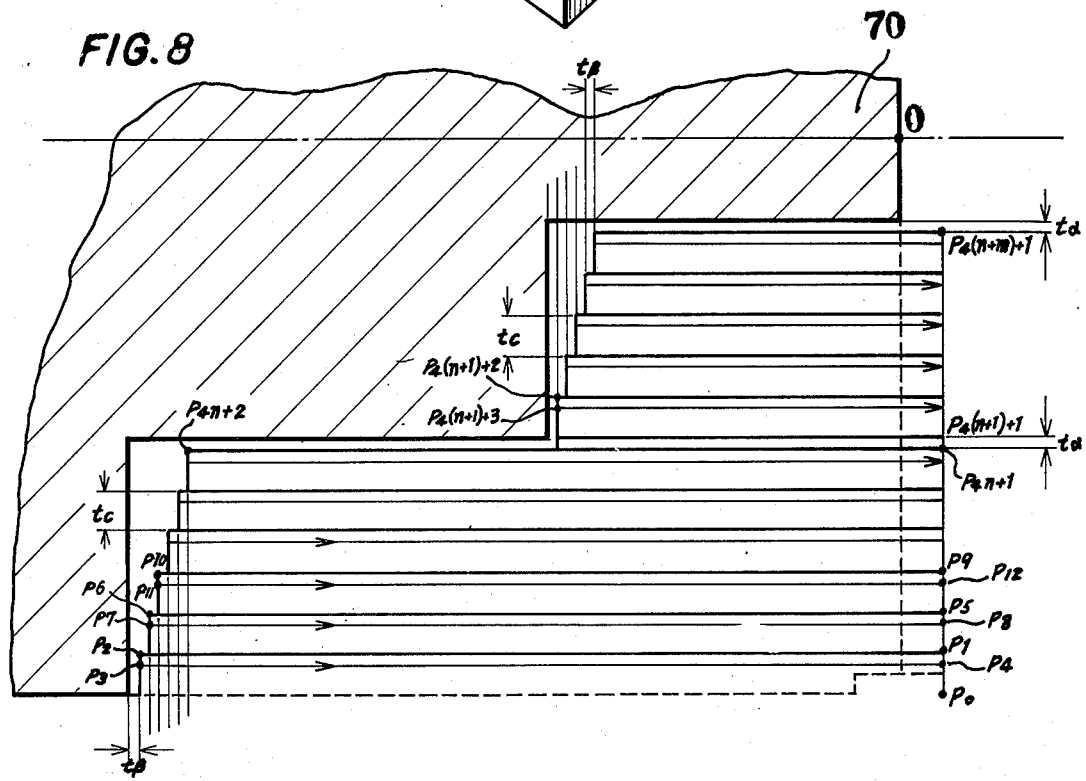
FIG. 8 shows an example concerning a locus of the tool edge on machining under a combination of right-hand outer diameter-rough cutting in the invention.
Figure 9:
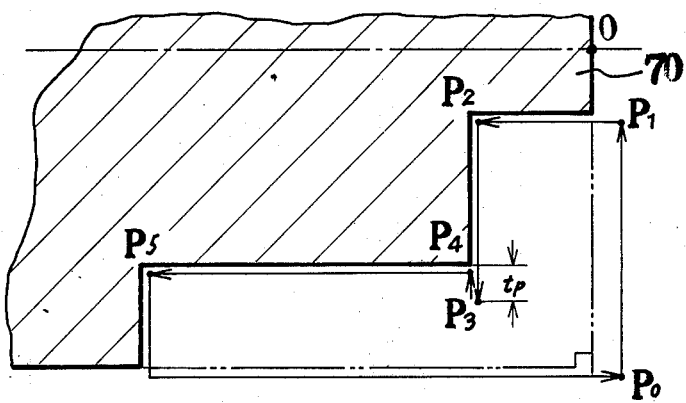
FIG. 9 shows an example concerning a locus of the tool edge on machining under a combination of right-hand outer diameter-finish in the invention.

As shown in FIG. 8, the position of the tool edge Pi displaces from position $P_O$ to position $P_1$ (in this example, we assume $A_1 < B_1$). At the third step 3S, counting pulse signals equal to [dimension of machining Zn in the aforementioned register 240 (in this case, $Z_1$) — dimension of leave on axis Z $t\beta$] are fed to counter Ci and the cutter traverses for machining. At this step, the position of the cutter edge Pi displaces from position $P_1$ to position $P_2$. At the fourth step 4S, counting pulse signals equal to [dimension of withdrawal of the tool edge tp] are fed to counter Ci and the cutting tool is quickly traversed to +X. At the fifth step 5S, counting pulse signals [dimension of machining Zn in the aforementioned register 240 (in this case $Z_1$) — dimension of excess stock on axis Z $t\beta$] are fed to counter Ci and the cutting tool is quickly traversed to +Z. The position of said cutter edge Pi displaces from position $P_3$ to position $P_4$. At the sixth step 6S, if comparison in the arithmetic unit Ca is $A_1 \leq B_1$, the aforementioned register is renewed by one step and the successive dimensions of machining are entered in said register. If the dimensions of machining Xn and Zn in said register are zero, the tool edge returns to the origin of machining and stop the machining cycle.

In the embodiment, dimensions of machining $Z_1$ and $Z_2$ are read out at said register 240. In said register 240, data concerning dimension of excess stock of axis Z $t\beta$ and depth of cut tc are set.

In case of $A_1 \leq B_1$ resulting from comparison at the aforementioned arithmetic unit Ca, the dimension of excess stock $t\beta$ in the aforementioned register 240 is set at $t\beta + t\beta$, i.e., cumulatively add at every comparison. And also, counting pulse signals of the dimension of withdrawal of tool edge tp are input in a register in connection with depth of cut tc in the aforementioned register 240, and, since then, the depth of cut becomes [ $tc + tp$ ].

In the embodiment, the comparison at the first step is $A_1 > B_1$, then, a cycle of machining from the first step is executed again. And, the position of the tool edge Pi finally returns to the origin position of machining $P_O$.

II. Now, is described one another example with the same conditions of the preset value on the first, second, and third groups of switches as (I) and with exception of the push button "finish" for the type of machining in the fourth group of switches 4B which is turned on and with change of tolls, The aforementioned dimension data Xn and Zn having tool correction term of the tool ($Tx_1$, $Tz_1$) (refer to FIG. 13) are input in the aforementioned main memory 210 by an operation, which is a similar operation in order to input data of said corrections $Tx_1$ and $Tz_1$ into said memory 210 by means of pushing of the push-button switches PB-1TXn and PB1TZn, for example.

At the first step 1S, the machining dimensions Xn and Zn are input in the aforementioned register 240 in reverse order, i.e., $X_2$ and $X_1$ for the dimension of machining Xn of the axis X is the embodiment, and the dimensions of machining Zn are input in order of $Z_2$ and $Z_1$.

At the second step 2S, counting pulse signals $A_2$ [actual position of tool edge for axis X, i.e., counting value of counter Cx] and counting pulse signals $B_2$ [dimension of machining for axis X, Xn + tool correction TXn] are input to arithmetic unit Ca. And counting pulse signals [pulse signals $A_2$-pulse signals $B_2$] are input to counter Ci, and the tool edge is quickly traversed to the direction of the sign on the axis X in said arithmetic unit Ca. In the embodiment, pulse signals $A_2$ are counting pulse signals equal to [$X_O$] and pulse signals $B_2$ are pulse signals equal to [$X_2 + TX_1$] and said position of tool edge Pi displaces from position $P_O$ to position $P_1$.

At the third step 3S, counting pulse signals $A_3$ [actual position of tool edge for axis Z, i.e., counted value of counter Cz] and counting pulse signals $B_3$ [dimension of machining for the axis Z An + tool correction TZn] are input to the arithmetic unit Ca. And counting pulse signals [pulse signal $A_3$ — pulse signal $B_3$] are input in counter Ci, and the tool edge displaces to the direction of the sign in said arithmetic unit Ca. In the embodiment, the pulse signals $A_3$ are counting pulse signals equal to $[Z_o]$ and the pulse signals $B_3$ are counting pulse signals equal to $[Z_2 + TZ_1]$ and said position of tool edge Pi displaces from position $P_1$ to position $P_2$.

At the fourth step 4S, data of machining dimension Xn and Zn in said register 240 are renewed by one step and the new data are checked if said data are zero. If the dimensions of machining Xn and Zn read out to said register 240 are zeros, the tool edge returns to the origin of machining $P_O$ and a machining cycle ends.

If the data of the dimensions of machining Xn and Zn in said register 240 are not zero, counting pulse signal $A_4$ [actual position of said tool edge for axis X, i.e., counted value in counter Cz] and counting pulse signals $B_5$ [dimension of maching Xn for axis X-dimension of withdrawal of tool edge $t_p$] are input to the arithmetic unit Ca. And counting pulse signals [pulse signals $A_4$— pulse signals $B_4$] are input to counter Ci and the tool edge traverses to the direction of sign on the axis X in said arithmetic unit Ca. In the embodiment, pulse signals $B_4$ are $[X_1 + t_p]$ and the position of said tool edge Pi displaces from position $P_2$ to position $P_3$.

At the fifth step 5S, counting pulse signals [dimension of withdrawal of tool edge $t_p$] are input in the counter Ci and the tool edge is quickly traversed to —X. In the embodiment, said position of tool edge Pi displaces from position $P_3$ to position $P_4$.

Then, the machining cycle after the third step 3S is executed again and said tool edge finally returns to the origin of machining.

Figure 16:
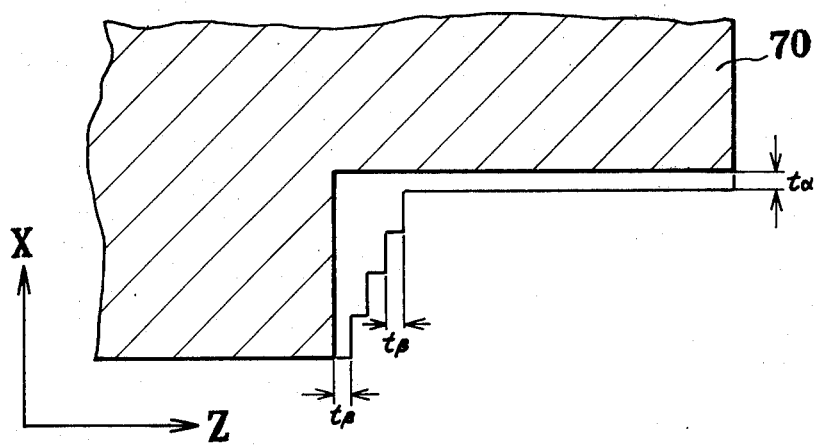
FIG. 16 shows a partial section along a longitudinal line of a work having a leave after machining under the type of right-hand outer diameter rough cutting in the invention.
Figure 17:
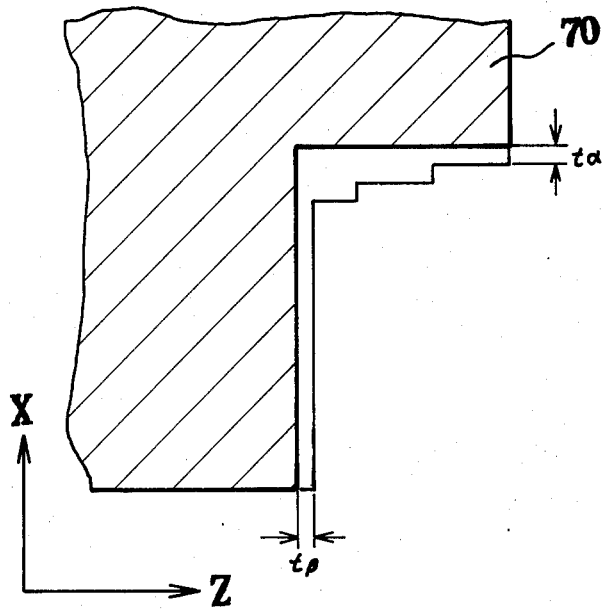
FIG. 17 shows a partial section along a longitudinal line of a work having a leave after machining under the type of in-feed rough cutting in the invention.

Machining conditions of work 70 on outer diameter or in-feed for the aforementioned direction of machining with rough cutting for the aforementioned type of machining are shown in FIG. 16 and 17. The work 70 is machined in case of outer diameter machining, as steps at a pitch of $t\beta$ on the axis Z and is machined, in case of direction of in-feed, as steps at a pitch of $t\alpha$ on the axis X.

Figure 10:
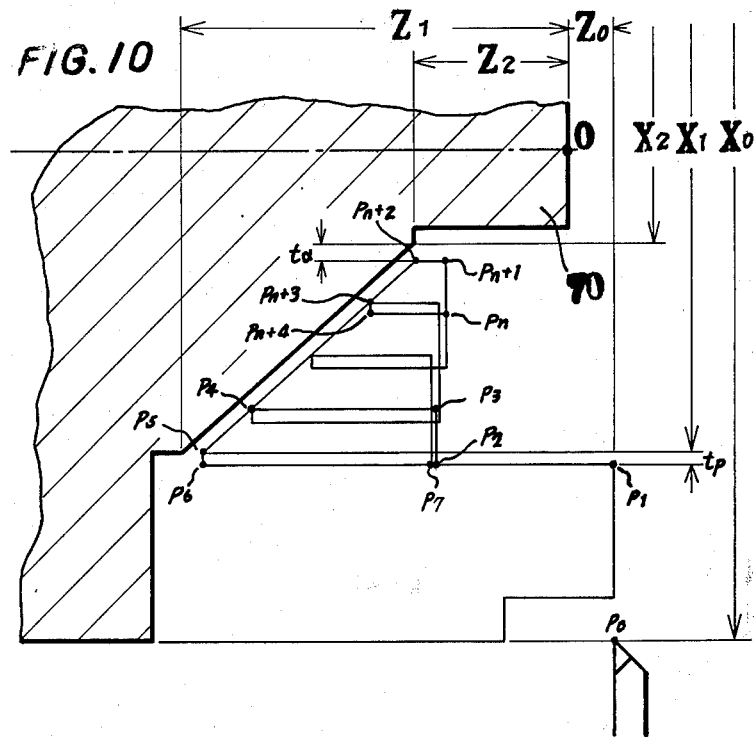
FIG. 10 shows an example concerning a locus of the tool edge on machining under a combination of right-hand taper turning-rough cutting in the invention.

(III) After machining of (II), a taper turning as shown in FIG. 10 is explained as an example.

Data of the maximum traveling length of the tool (dimension of machining) $x_1, z_1, x_2, z_2$ (refer to FIG. 10) are input through the first group of switches in a similar process of (I). A push button for "right-hand taper machining" in the fourth group of switches 4A and a push button for "rough cutting" in the fourth group of switches 4B are turned on. Other switches in the second and third group of switches are not changed.

Upon a push of the aforementioned push button PB-MS, numerically coded signals introduced in the aforementioned main memory 216 are transferred in the aforementioned register and instruction signals in the operational programming blocks corresponding to the tape of machining combined "right-hand taper turning and rough cutting" are introduced into the aforementioned main memory 210.

Then, upon a push of the aforementioned push button PB-AST, execution of the operational program for said combined type of machining starts. The operational programming blocks is, for example, as shown in FIG. 14.

At the first step 1S, counting pulse signals $A_1$ [counted value in counter Cx] and counting pulse signals $B_1$ [dimension of machining $x_1$ + dimension of withdrawal of tool edge thd p] are input in the arithmetic unit Ca. And counting pulse signals [aforementioned $A_1$— aforementioned $B_1$] are entered in counter Ci and tool edge Pi is quickly traversed to —X. The position of the tool edge $P_O$ then, displaces to position $P_1$.

Then, counting pulse signals $A_2$ [dimension of machining $z_2$] are input in arithmetic unit Ca. And counting pulse signals equal to signals $A_2$ are input in counter Ci and the tool edge Pi is quickly traversed to —Z. The tool edge, then, displaces from position $P_1$ to position $P_2$.

At the second step 2S, counting pulse signals $A_3$ [counted value in counter Cx] and counting pulse signals $B_3$ [dimension of machining $x_2$ + dimension of leave $t_\alpha$] are input in the arithmetic unit Ca. And the aforementioned signals $A_3$ is compared with the aforementioned signals $B_3$. If the comparison is $A_3 > B_3$, the program of the third step is executed and, if $A_3 \leq B_3$, the program of the seventh stop is executed. Now, we describe in case of $A_3 > B_3$.

At the third step 3S, counting pulse signals are input in counter Ci and the tool edge Pi is quickly traversed to —X. The position of tool edge Pi, then, displaces from position $P_2$ to position $P_3$.

At the fourth step 4S, counting pulse signals $A_4$ [dimension of machining z, — (dimension of leave $$t_\alpha - ntc \times \frac{(z_1 - z_2)}{(x_2 - x_1)})]$$

and counting pulses signals $B_4$ [counted value of counter Cz] are input in arithmetic unit Ca. And then, counting pulse signals (the aforementioned signals $A_4$—the aforementioned signals $B_4$) are input in counter Ci and the tool edge Pi is traversed for machining to —z. The position of tool edge Pi, then, displaces from position $P_3$ to position $P_4$.

At the fifth step 5S, the operation of $$[2tc \times \frac{(z_1 - z_2)}{(X_2 - X_1)}]$$

is executed in arithmetic unit Ca.

And counting pulse signals equal to counted value $A_5$ in said arithmetic unit Ca are input in counter Ci and the tool edge Pi is traversed for taper turning. In the taper turning, the tool edge Pi traverses for maching at $V_2 = V_s$ to —Z and at machining speed $$V_x = \frac{(X_2 - X_1)}{2(z_1 - z_2)} V_s$$

to +X derived from machining speed $V_s$ preset by the aforementioned switch SW-SS. The machining speed Vx inverted to analog signals by well-known D-A converter from counting pulse signals equal to an operated value $$\frac{(X_2 - X_1)}{2(z_1 - z_2)}$$

in arithmetic unit are fed to and executed in the aforementioned feed mechanism. And the position of tool edge P$i$ displaces from position P$_4$ to position P$_5$.

At the sixth step 6S, counting pulse signals [dimension of withdrawal of tool $tp$] are input to counter C$i$ and the tool edge P$i$ is quickly transversed to +X. The position of tool edge P$i$, then, displaces from position P$_5$ to position P$_6$. At the seventh step 7S, an operation of [A$_6$ − B$_6$] of which A$_6$ is counting pulse [dimension of machining z$_2$] and B$_6$ is dimension of [dimension of machining z$_2$] and B$_6$ is counting pulse signals equal to [counted value in counter C$z$] is executed in arithmetic unit C$a$. Counting pulse signals equal to said [A$_6$ − B$_6$] are input in counter C$i$ and the tool edge is quickly traversed to +Z. The position of tool edge P$i$, then, displaces from position P$_6$ to position P$_7$.

After completion of the seventh step 7S, a program of the second step 2S'' is executed again.

Where the comparison A$_3$ ≦ B$_3$, the following sequence occurs.

At the eighth step 8S, such operation as [A$_3$ − N$_3$] in the step 2S' is executed in arithmetic unit C$a$, and counting pulse signals equal to the operated value are input in counter C$i$, and the tool edge P$i$ is quickly traversed to −X. The position of tool edge P$i$ displaces from position P$n$ to position P$n$+$_1$.

At the ninth step 9S, counting pulse signals [origin of coordinate of machining Z$_0$] are input in counter C$i$ and the tool edge P$i$ is quickly traversed to −Z. The position of tool edge P$i$ displaces from position P$n$+$_1$ to position P$n$+$_2$.

At the tenth step 10S, an operation of (counting pulse signals A$_3$ equal to the operated values)

$$x \frac{2(z_1 - z_2)}{(X_2 - X_1)}$$

is executed in arithmetic unit C$a$. And, counting pulse signals equal to the operated values in the arithmetic unit C$a$ are input in counter C$i$ and the tool edge P$i$ is traversed for paper turning. This taper turning is executed as in the step 5S. The position of tool edge P$i$ displaces from position P$n$+$_2$ to position P$n$+$_3$.

At the eleventh step 11S, counting pulse signals [dimension of withdrawal of tool edge $tp$] are input in counter C$i$ and the tool edge P$i$ in quickly traversed to +X.

At the twelveth step 12, an operation of [A$_8$ − B$_8$] of which A$_8$ is counting pulse signals equal to [counted value of counter C$z$] and B$_8$ is counting pulse signals [dimension of machining z$_2$] is executed in arithmetic unit C$a$. The counting pulse signals in the arithmetic unit C$a$ [A$_8$ − B$_8$] are input to counter C$i$ and the tool edge P$i$ is quickly traversed to +Z.

After then, the position of tool edge returns to the origin of machining (X$_0$, Z$_0$) and completed the machining cycle.

IV. I will describe machining in case that a push button of "rough cutting" in the fourth group of switches 4B is turned on and a cutting tool can be changed without changing data of the maximum traveling length of the cutting tool. The correction quantities for the new tool are TX$_2$ and TZ$_2$, which are input in memory 201 through the aforementioned switches PB-2TX$n$ and PB-2TZ$n$.

Figure 11:
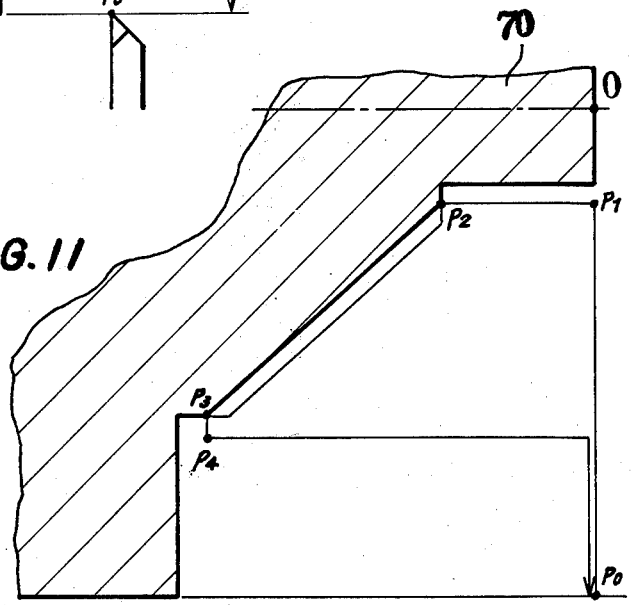
FIG. 11 shows an example concerning a locus of the tool edge on machining under combination of right-hand taper turning - finish in the invention.

At the first step 1S, data of machining are transferred to the aforementioned shift register 204 in reverse order (refer to FIG. 11 and 15).

At the second step 2S, an operation of [A$_1$ − B$_1$] of which A$_1$ is counting pulse signals [counted value of counter C$x$] and B$_1$ is counting pulse signals [dimension of machining x$_2$+correction of tool TX$_2$] is executed unit C$a$. And counting pulse signals equal to the operated value [A$_1$ − B$_1$] are input in counter C$i$ and the tool edge P$i$ is quickly traversed to −X. The position of the tool edge P$i$, then, displaces from position P$_0$ to position P$_1$.

At the third step 3S, counting pulse signals A$_2$ [dimension of machining z$_2$ + correction of tool TZ$_2$ + origin of coordinate of machining Z$_0$] are input in counter C$i$ and the tool edge P$i$ is quickly traversed to −Z. The position of the tool edge P$i$, then, displaces from position P$_1$ to position P$_2$.

At the fourth step 4S, an operation of [A$_3$ − B$_3$] of which A$_3$ is counting pulse signals [dimension of machining z$_1$] and B$_3$ is counting pulse signals [counted value in counter C$z$] is executed in arithmetic unit C$a$. And counting pulse signals equal to an operated value [A$_3$ − B$_3$] are input in counter C$i$ and the tool edge P$i$ is traversed for taper turning. This taper turning is executed same as in the step 5S' in (III). The position of tool edge P$i$ displaces from position P$_2$ to position P$_3$.

At the fifth step 5S, counting pulse signals [dimension of withdrawal $tp$] are input to counter C$i$ and the tool edge P$i$ is quickly traversed to +X. The position of tool edge P$i$, then, displaces from position P$_3$ to position P$_4$.

After then, the tool edge P$i$ returns to the origin of machining (X$_0$, Z$_0$) and a machining cycle is completed.

V. Setting the aforementioned switch PB-TW in close position after setting the aforementioned switch PB-MW in closed position, the aforementioned external memory 300 starts to function, and then, machining of (I) and (II) begins. I will describe in detail.

If the aforementioned switch PB-TW is closed, data stored in the aforementioned main memory 210 through the aforementioned circuit III and address signals in the ROM are recorded through recording circuit 310 and feed mechanism 330, in a paper tape, for example.

A program of machining is executed according to the data recorded on said recording medium and the aforementioned address of the program in the aforementioned ROM.

Signals of the data and the program addresses read out by means of the said circuit 320 transfer data and programs to the aforementioned main memory, of which data can be displayed in display DISP by the aforementioned group of switches PB-RD, and of which the direction of machining and the type of machining in said program are shown at the corresponding switches in the groups 4A and 4B by lighting lamps.

In this case after a machining cycle (I), an interraption can be recorded in the aforementioned recording medium by the push button PB-PROS, for example, and the programs of the machining can be memorized as one number for one block. Upon reading out by instruction of an operator by means of the aforementioned switch PB-TR, the aforementioned program number can be appointed by controlling the aforementioned feed mechanism 330 by means of multi-contact rotary switch PB-SQNO, for example.

The program control mechanism in the embodiment of machining can be checked by interrupting the main power source of control mechanism 450 and the aforementioned computer 200 and by operating mechanical parts supplied from a temperary source, for example, a stabilized power source, through many input terminals in the aforementioned control mechanism 410. And also, by substitution the aforementioned pulse generator 430 to a signal generator, for example, well-known audio frequency standard signal generator, computer 200 can be checked.

What is claimed is:

1. A method for numerical control of the displacement of a working tool with respect to a rotated article according to a computer having a main memory capable of storing an executing program block and data; an executing part for executing arithmetic operation according to said executing program block; a read only memory storing plural executing program blocks therein; an input-output controller for controlling the transfer of signals to an external device; and a control unit for controlling the introduction of the executing program block from the read only memory into the main memory, the read out of one instruction of the executing program block, the read out of the data of the main memory by said executing program block, the execution of arithmetic operation of the executing part, and the transfer of signals by the input-output controller; comprising
   a. a step of first coding a data group concerning the limit displacing distances of said working tool in the radial and axial directions of said rotated article and storing thus coded signals with sequential codes in the main memory of said computer;
   b. a step of second coding a data group for determining the distance of displacement of said working tool according to the mode of working and storing thus coded signals into the main memory of said computer, said data group at least containing, as reference data for coordinate values of work start point, data indicating the coordinate values of position of the blades of said working tool with respect to the rotational center of said article at an end face thereof from which the working is to be started, said working tool being stopped at said position after a trail working on said rotated article;
   c. a step of selecting one of said plural executing program blocks and introducing thus selected program block into said main memory of said computer;
   d. a step of introducing, upon reception of a work start signal, said coded signals with sequential codes into the executing part of said computer according to the instruction signals of said executing program block stored in said main memory; and
   e. a step of introducing pulse train signals proportional to the distance of displacement of said working tool into the executing part of said computer and controlling the displacement of said working tool by means of an output signal obtained from said computer.

2. A method for numerical control according to the claim 1 which comprises a mathematical executing operation performed in the executing part of said computer being performed based at least on the data indicating the coordinate of blade of said working tool after the completion of a working stroke and the coded data defined by said first and second coding steps.

3. A method of numerical control according to the claim 1 which comprises said step of introducing coded signals with sequential codes defined by said first coding step into the executing part of said computer being performed in reversible sequential order.

4. A numerical control system for controlling the displacement of a working tool with respect to a rotated article according to a computer having a main memory capable of storing an executing program block and data; an executing part for executing arithmetic operation according to said executing program block; a read only memory storing plural executing program blocks therein; an input-output controller for controlling the transfer of signals to an external device; and a control unit for controlling the introduction of the executing program block from the read only memory into the main memory, the read out of one instruction of the executing program block, the read out of the data of the main memory by said executing program block, the execution of arithmetic operation in the executing part, and the transfer of signals by the input-output controller, comprising;
   a. a first encoder circuit connected with a first program switch group for defining data groups concerning the limit displacement of said working tool with respect to the radial and axial directions of said rotated article in combination with sequential codes and also connected with the input-output controller of said computer;
   b. second encoder circuit connected to the second program switch group defining the distance of displacement of said working tool according to the mode of said working and further connected with the input-output controller of said computer;
   c. a third encoder circuit connected to a third program switch group for selecting one of said plural executing program blocks and introducing thus selected program block into said main memory and further connected with the input-output controller of said computer;
   d. a pulse generator generating a pulse train proportional to the distance of displacement of said working tool and being connected to said computer;
   e. means for controlling the displacement of said working tool according to the execution output signal of said computer; and
   f. an operating panel containing said first to third program switch groups, indicating instruments of the counters of the executing part of said computer and an automatic operation instruction switch group on a single panel.

5. A numerical control system according to the claim 4 comprising a displacement instruction converting means which consists of a signal source generating an electric signal of a determined level, a selector switch provided with a panel indicating a standard marker and a scale plate indicating various amounts of displacement, transmission lines and a signal generator circuit for generating a displacing speed instruction signal, wherein said signal source generates a displacing amount instruction signal in response to the amount of displacement on said scale plate corresponding to said standard marker on said panel, which signal is introduced through said selector switch and said transmission lines to said signal generator circuit which converts thus received signal into a displacing speed instruction signal thereby controlling the displacing speed of said working tool.

6. A numerical control system according to the claim 5 comprising said displacement instruction converting means wherein the number of said transmission lines is equal to the number of BCD.

* * * * *